United States Patent
Karuppiah et al.

(10) Patent No.: US 11,489,888 B2
(45) Date of Patent: Nov. 1, 2022

(54) APPARATUS, SYSTEM, METHOD, AND COMPUTER-READABLE RECORDING MEDIUM FOR DETECTING DEVICES IN A NETWORK AND TRANSFERRING A MEDIA SESSION

(71) Applicant: ARRIS Enterprises LLC, Suwanee, GA (US)

(72) Inventors: Sadeesh Kumar Karuppiah, Karnataka (IN); Richard Moore, Jr., Harleysville, PA (US); Sudeepta Bhuyan, Karnataka (IN); Smit Bharada, Gujarat (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/155,544

(22) Filed: Jan. 22, 2021

(65) Prior Publication Data
US 2021/0258353 A1    Aug. 19, 2021

Related U.S. Application Data

(60) Provisional application No. 62/977,951, filed on Feb. 18, 2020.

(51) Int. Cl.
*H04L 65/1104* (2022.01)
*H04L 61/103* (2022.01)
(Continued)

(52) U.S. Cl.
CPC ........ *H04L 65/1104* (2022.05); *H04L 61/103* (2013.01); *H04L 65/1069* (2013.01); *H04L 2101/622* (2022.05)

(58) Field of Classification Search
CPC ............... H04L 65/1006; H04L 61/103; H04L 61/6022; H04L 65/1069
See application file for complete search history.

(56) References Cited

U.S. PATENT DOCUMENTS 8,340,271 B2    12/2012  Knaz
9,642,167 B1 *  5/2017   Snyder ............... G01S 5/0252
(Continued)

FOREIGN PATENT DOCUMENTS

WO    2012/059961    5/2012
WO    2015/047216    4/2015

OTHER PUBLICATIONS

Notification of Transmittal of the International Search Report and the Written Opinion of the International Searching Authority dated Apr. 6, 2021 in International (PCT) Application No. PCT/US2021/014572.

(Continued)

*Primary Examiner* — Khaled M Kassim
(74) *Attorney, Agent, or Firm* — Wenderoth, Lind & Ponack, L.L.P.

(57) ABSTRACT

An apparatus, system, method, and computer-readable recording medium transfer a media session from a companion device to a media hub device connected in a network. A swipe operation is performed on the companion device, and a scan request is transmitted from the companion device to media hub devices connected in the network. The companion device receives a response packet from each media hub device based on the scan request. Each response packet includes a media access control (MAC) address. The companion device calculates a received signal strength indicator (RSSI) indicating signal strengths of the media hub devices based on each response packet, and determines a media hub device having a strongest signal strength. A media session executing on the companion device is then transferred over IP to the media hub device having the strongest signal strength.

21 Claims, 5 Drawing Sheets

(51) Int. Cl.
    *H04L 65/1069*     (2022.01)
    *H04L 101/622*     (2022.01)

(56) References Cited

U.S. PATENT DOCUMENTS

| | | | |
|---|---|---|---|
| 10,966,306 B1* | 3/2021 | Recker | H02J 9/02 |
| 2002/0078459 A1* | 6/2002 | McKay | G09F 27/00 |
| | | | 348/E7.087 |
| 2009/0064014 A1* | 3/2009 | Nelson | H04N 21/44222 |
| | | | 715/764 |
| 2015/0106175 A1* | 4/2015 | Kang | H04W 4/80 |
| | | | 705/14.4 |
| 2015/0189461 A1* | 7/2015 | Pang | H04W 76/14 |
| | | | 455/41.1 |
| 2015/0289111 A1* | 10/2015 | Ozkan | H04W 4/33 |
| | | | 455/456.1 |
| 2016/0316371 A1* | 10/2016 | Chen | H04W 12/08 |
| 2017/0086025 A1* | 3/2017 | Cai | H04W 4/06 |
| 2017/0272166 A1* | 9/2017 | Albrecht | H04B 10/27 |
| 2018/0373912 A1* | 12/2018 | Albrecht | H04W 4/80 |
| 2019/0373675 A1* | 12/2019 | Chari | H04W 16/26 |
| 2020/0106877 A1* | 4/2020 | Ledvina | H04M 1/72436 |
| 2022/0014041 A1* | 1/2022 | Knode | H04W 4/06 |

OTHER PUBLICATIONS

International Preliminary Report on Patentability dated Aug. 23, 2022 in International (PCT) Application No. PCT/US2021/014572.

\* cited by examiner

APPARATUS, SYSTEM, METHOD, AND COMPUTER-READABLE RECORDING MEDIUM FOR DETECTING DEVICES IN A NETWORK AND TRANSFERRING A MEDIA SESSION

TECHNICAL FIELD

The subject matter of the present disclosure relates generally to the transferring of a media session between devices in a network.

BACKGROUND

Media hub devices such as set-top boxes and smart media devices are integrated into a residential network for interacting with a user, obtaining content and information, and communicating with other connected devices for providing the content and the information to the user.

A mobile device such as smartphone and tablet are examples of devices that can be connected in the residential network and communicate with the media hub devices. When using a mobile device such as smartphone or tablet to watch a video or listen to audio (i.e., a media session), a user may decide to transfer the media session to another device such as one or more media hub devices in the residential network.

One conventional solution required the user to select the destination device using, for example, a drop down menu and then route the video or audio to the selected destination device. However, this solution can result in the selection of the wrong destination device or a destination device that is out of range and not necessarily the best device for transferring the media session, thereby negatively affecting the viewing quality of the transferred media session.

Thus, it would be advantageous and an improvement over the relevant technology to provide an apparatus, system, method, and computer program that quickly, efficiently, and effectively detects devices in a wireless network and transfers a media session without affecting the quality of the transferred media session.

SUMMARY

An embodiment of the present disclosure provides a method for transferring a media session from a companion device to a media hub device connected in a network. The method includes executing a swipe operation on the companion device, and transmitting a scan request from the companion device to media hub devices connected in the network. The method includes receiving at the companion device a response packet from each media hub device based on the scan request. Each response packet includes a media access control (MAC) address. Each response packet may also include a device name.

The method further includes calculating in the companion device a received signal strength indicator (RSSI) indicating signal strengths of the media hub devices based on each response packet, and determining in the companion device a media hub device having a strongest signal strength based on the calculated RSSI and the MAC address for each media hub device. A media session executing on the companion device is transferred over Internet Protocol (IP) to the media hub device having the strongest signal strength using a stored IP address for the media hub device.

In this embodiment of the present disclosure, the method further includes periodically transmitting from the companion device an IP multicast device discovery request to the media hub devices, and receiving at the companion device a unicast device discovery response from each media hub device based on the device discovery request. Each device discovery response includes the device name and the MAC address of each media hub device transmitting the device discovery response.

The method further includes creating in the companion device a table of all the media hub devices in the network. The table includes the device names, corresponding IP addresses, and the MAC addresses for the media hub devices. The stored IP address used for transferring the media session to the media hub device is selected from the table. Each response packet can be a Bluetooth Low Energy (BLE) advertisement packet with the MAC address being a BLE MAC address. The MAC address in each device discovery response can also be the BLE MAC address.

An embodiment described in the present disclosure provides a system for transferring a media session from a companion device to a media hub device connected in a network. The system includes a companion device configured to execute the media session, wherein the companion device includes a communication interface, a user interface, a hardware processer, and a memory storing one or more programs. The system also includes media hub devices each configured to receive and execute the media session. Each media hub device includes a communication interface, a hardware processer, and a memory storing one or more programs. The system further includes a communication connection configured to establish a connection between the communication interface of the companion device and the communication interface of each media hub device. The one or more programs when executed by the respective hardware processors of the companion device and the media hub devices control the system to detect a swipe operation performed using the user interface of the companion device, and transmit a scan request from the communication interface of the companion device to communication interfaces of the media hub devices over the communication connection.

The companion device receives at the communication interface a response packet transmitted over the communication connection from each media hub device based on the scan request, wherein each response packet includes a media access control (MAC) address. Each response packet may also include a device name. The companion device calculates a signal strength indicator (RSSI) indicating signal strengths of the media hub devices based on each response packet, and determines a media hub device having a strongest signal strength based on the calculated RSSI and the MAC address for each media hub device. The companion device transfers, over Internet Protocol (IP) and using the communication connection, the media session to the media hub device having the strongest signal strength, based on a stored IP address for the media hub device.

In an embodiment of the present disclosure, the one or more programs when executed by the respective hardware processors of the companion device and the media hub devices further control the system to update the table in the memory of the companion device to include the signal strengths of the media hub devices based on the RSSIs, wherein the signal strengths of the media hub devices in the table are periodically updated based on changes in the RSSIs.

In an embodiment of the present disclosure, the media hub device can be a set-top box or smart media device, and the network can be a residential wireless network. Additionally, the companion device can be wireless mobile device including a smartphone, tablet, digital personal assistance, or hand-held wireless device.

An embodiment described in the present disclosure provides a companion device for transferring a media session to a media hub device connected in a network. The companion device includes a communication interface, a user interface, a hardware processer, and a memory storing one or more programs. The one or more programs when executed by the hardware processor control the companion device to detect a swipe operation performed via the user interface, and transmit a scan request from the communication interface to media hub devices over a communication connection, based on the swipe operation. The companion device receives a response packet transmitted over the communication connection from each media hub device based on the scan request, calculates an RSSI indicating signal strengths of the media hub devices based on each response packet, and determines a media hub device having a strongest signal strength based on the calculated RSSI and the MAC address for each media hub device. The companion device transfers, over Internet Protocol (IP) and using the communication connection, the media session to the media hub device having the strongest signal strength, based on a stored IP address for the media hub device. The companion device can be wireless mobile device including a smartphone, tablet, digital personal assistance, or hand-held wireless device.

An embodiment described in the present disclosure provides a non-transitory computer-readable recording medium for transferring a media session from a companion device to a media hub device connected in a network. The non-transitory computer-readable recording medium stores one or more programs which when executed by a hardware processor in the companion device to perform the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
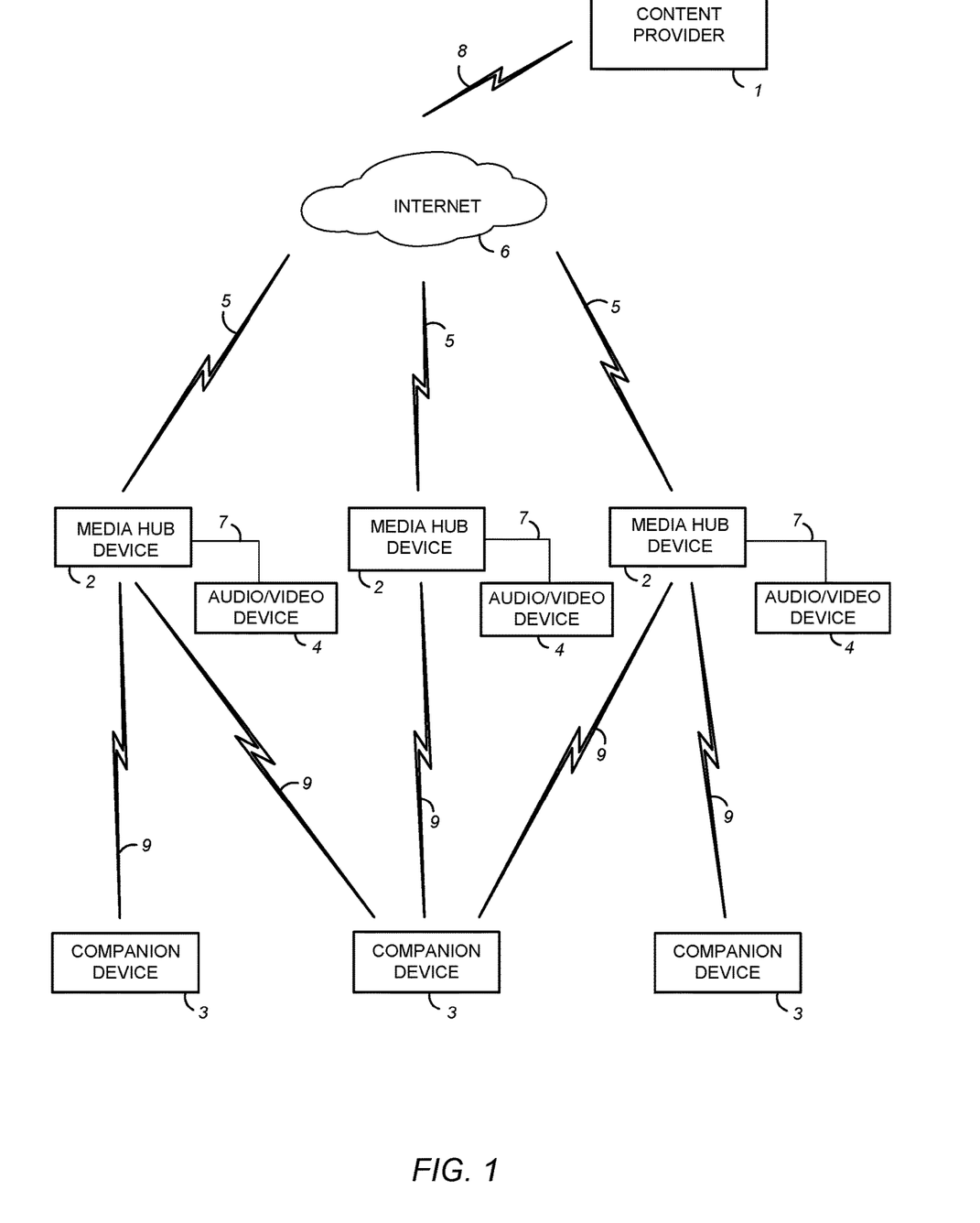
FIG. 1 is a schematic diagram of a system for transferring a media session from a companion device to a media hub device connected in a network according to an embodiment of the present disclosure.

FIG. 1 is a schematic diagram of a system for transferring a media session from a companion device to a media hub device connected in a network according to an embodiment of the present disclosure.

As shown in FIG. 1, the network includes a content provider 1 connected to media hub devices 2 through the Internet 6. Additionally, the media hub devices 2 are configured to be connected with audio/video devices 4 and to companion devices 3. It is contemplated by the present disclosure that the network is operating as a local area network (LAN), wireless local area network, or virtual local area network (VLAN). The network may also include the use of a media over coax (MoCA) network.

The content provider 1 can be a cable television provider, a satellite television provider, an internet service provider, or multiple system operators for providing content to the media hub devices 2. The connection 8 between the Internet 6 and the content provider 1 can be implemented as a network connection that operates in accordance with a wide area network (WAN), a local area network (LAN), a virtual private network (VPN), metropolitan area networks (MANs), personal area networks (PANs), wireless local area networks (WLANs), system area networks (SANs), a public switched telephone network (PTSA), a global Telex network, or a 2G, 3G, 4G or 5G network.

The connections 5 between the Internet 6 and the media hub devices 2 can be implemented using a DSL connection, a cable modem, a broadband mobile phone network, or other similar connections. Additionally, the connections 5 can be implemented using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is also contemplated by the present disclosure that the media devices 2 are capable of providing connections between the network and a WAN, a LAN, a VPN, MANs, PANs, WLANs, SANs, a PTSA, a global Telex network, or a 2G, 3G, 4G or 5G network using connection 5.

Each media hub device 2 is a wireless electronic device that obtains content from the content provider 1, and routes the content received from the content provider 1 to other devices in the network (e.g., audio/video device 2 and companion devices 3). The media hub devices 2 can also receive content such as a video and audio (i.e., media sessions) from the companion devices 3, which can be output to, for example, the audio/video device 4. It is contemplated by the present disclosure that the media hub device 2 can be, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. QAM is a digital television standard using quadrature amplitude modulation and is a format by which digital cable channels are encoded and transmitted via cable television providers. The components of an exemplary media hub device 2 are discussed in more detail with reference to FIG. 2.

As shown in FIG. 1, each media hub device 2 is connected to the audio/video device 4 over, for example, an HDMI connection 7 such that the media hub device 2 and the audio/video device 4 can communication over the HDMI connection 7 using consumer electronic control (CEC) messaging. Each audio/video device 4 is, for example, a TV such as a standard cathode ray tube (CRT), liquid crystal display (LCD), light emitting diode (LED), plasma, or organic LED TV configured with speakers.

Additionally, the connection 7 can also be implemented using a wireless connection that operates in accordance with, but is not limited to, IEEE 802.11 protocol, an RF4CE protocol, ZigBee protocol, Z-Wave protocol, or IEEE 802.15.4 protocol. It is contemplated by the present disclosure that the connection 7 can be implemented using a wireless connection in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using short-wavelength Ultra high frequency (UHF) radio waves from 2.4 to 2.485 GHz.

As shown in FIG. 1, the media hub devices 2 also routes data, content, and messages to and from the companion devices 3 in the network. The companion devices 3 are, for example, wireless mobile devices that include, but are not limited to, a computer, a portable device, an electronic tablet, a smart phone, personal digital assistant, or other wireless hand-held consumer electronic device capable of receiving, executing, and outputting audio and video content. The components of an exemplary companion device 2 are discussed in more detail with reference to FIG. 3.

The connections 9 between the media hub devices 2 and the companion devices 3 can be implemented using a wireless connection in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using short-wavelength UHF radio waves from 2.4 to 2.485 GHz.

Additionally, the connections 9 can also be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 9 can include connections to a media over coax (MoCA) network within the network.

In general, it is contemplated by the present disclosure that each media hub device 2 and companion device 3 include electronic components or electronic computing devices operable to receive, transmit, process, store, and/or manage data and information associated with the network, which encompasses any suitable processing device adapted to perform computing tasks consistent with the execution of computer-readable instructions stored in a memory or a computer-readable recording medium.

Further, any, all, or some of the computing devices in each media hub device 2 and companion device 3 can be adapted to execute any operating system, including Linux, UNIX, Windows, MacOS, DOS, and ChromOS as well as virtual machines adapted to virtualize execution of a particular operating system, including customized and proprietary operating systems. Each media hub device 2 and companion device 3 are further equipped with components to facilitate communication with other computing devices over the one or more network connections to local and wide area networks, wireless and wired networks, public and private networks, and any other communication network.

Figure 2:
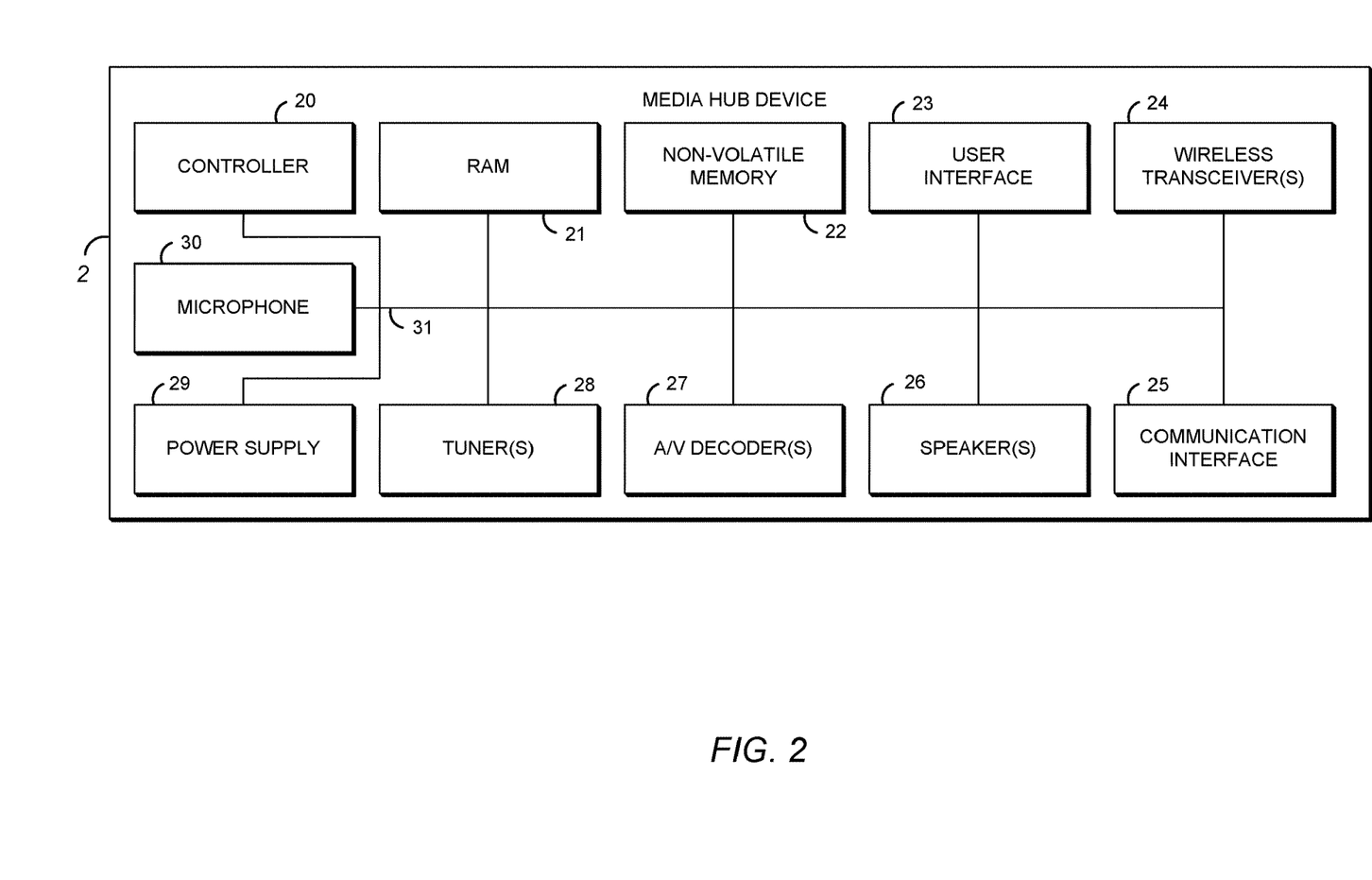
FIG. 2 illustrates a more detailed schematic diagram of an exemplary media hub device according to an embodiment of the present disclosure.

FIG. 2 illustrates a more detailed schematic diagram of an exemplary media hub device according to an embodiment of the present disclosure.

The media hub device 2 is a wireless electronic device that obtains content from the content provider 1, and routes the content received from the content provider 1 to and from other devices in the network (e.g., audio/video devices 4 and companion devices 3). The media hub device 2 includes components, circuits and software for receiving, decoding, storing, converting, and outputting the A/V content to the audio/video device 4 and to other external devices (e.g., companion device 4). The media hub device 2 can also receive content from a companion device 3 (e.g., a media session of video or audio content). It is contemplated by the present disclosure that the media hub device 2 can be, but is not limited to, a traditional IP/QAM set-top box or SMD that includes components, circuits and software for decoding audio/video content, and playing OTT or MSO provided content. The media hub device 2 can be implemented within another electronic device such as television, a computer, a portable device, an electronic tablet, or other digital receiver set.

As shown in FIG. 2, the media hub device 2 includes a controller 20, a random access memory (RAM) 21, a non-volatile memory 22, a user interface 23, one or more wireless transceivers 24, a communication interface 25, one or more speakers 26, one or more audio/video (A/V) decoders 27, one or more tuners 28, a power supply 29, and microphone 30.

The controller 20 controls the general operations of the media hub device 2 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the media hub device 2 in accordance with the present disclosure.

The RAM 21 can be implemented as a working memory for the controller 20 and the non-volatile memory 22 can be provided for the storage of program code, software, or algorithms for receiving, decoding, and executing audio/video content, OTT or MSO provided content, implementing far field voice (FFV) capability, a smart assistant (e.g., Alexa, Google assistant, or some other assistant module or program), and other operations of the media hub device 2 in accordance with the present disclosure. It is contemplated by the present disclosure that the non-volatile memory 22 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The RAM 21 and the non-volatile memory 22 can be used to store any type of data, instructions, software, algorithms, processes, or operations for controlling the general functions of the media hub device 2 in accordance with the present disclosure.

The user interface 23 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the media hub device 2. The one or more wireless transceiver 24 are, for example, Wi-Fi WLAN interface radio transceivers, or in-home LTE (Long Term Evolution) transceivers that outputs signals of selected channels and include various network cards, interfaces, and circuitry implemented in software and/or hardware to enable communications between the media hub device 2 and other wireless devices (e.g., companion device 3) in the network via connection 9.

The wireless transceivers 24 can include a transceiver that operates in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using short-wavelength UHF radio waves from 2.4 to 2.485 GHz. However, the data rate and distance for exchanging data between the media hub device 2 and other wireless devices in the network depend on the generation of wireless technology being implemented. The wireless transceivers 24 can also include a transceiver that operates in accordance with, but is not limited to, IEEE 802.11 protocol, an RF4CE protocol, ZigBee protocol, Z-Wave protocol, or IEEE 802.15.4 protocol.

The communication interface 25 includes various network cards, interfaces, and circuitry implemented in software and/or hardware to enable communications between, for example, the media hub device 2 and the audio/video device 4, and between the media hub device 2 and the Internet 6. To this end, the various network cards, interfaces, and circuitry of communication interface 25 enable communications using connection 7 via HDMI such that the media hub device 2 and the audio/video device 4 can communication over the connection 7 using consumer electronic control (CEC) messaging.

The communication interface 25 includes various network cards, interfaces, and circuitry implemented in software and/or hardware to enable communications between the media hub device 2 and the Internet 6 via connection 5 using a DSL connection, a cable modem, a broadband mobile phone network, or other similar connections. It is also contemplated by the present disclosure that the communication interface 25 includes various network cards, interfaces, and circuitry implemented in software and/or hardware to enable communications between the media hub device 2 and the Internet 6 using a protocol in accordance with a WAN, a LAN, a VPN, MANs, PANs, and WLANs, SANs, a PTSA, a global Telex network, or a 2G, 3G, 4G or 5G network using connection 5. The communication interface 25 also includes various network cards, interfaces, and circuitry implemented in software and/or hardware to enable communications with the media hub device 2 and a MoCA network.

The one or more speakers 26 can be standard built-in wired or wireless speakers that convert audio signals to sound. That is, the one or more speakers 26 can be used to output audio content received from the content provider 1, the companion device 3, or output sound in response to a voice command by a user. The one or more A/V decoders 27 decode selected signals from the content provider 2 so that the A/V content is usable for use by other devices in the network (e.g., audio/video device 4 and companion device 3). It is contemplated by the present disclosure that the A/V decoders are capable of processing the A/V content into multiple data formats such as, but not limited to, converting from MPEG-4/advanced audio coding (AAC) to MPEG-2/MP3.

The one or more tuners 28 tune selected channels for receiving A/V content based on the input instruction received using a voice command or using the user interface 23 on the media hub device 2. For example, the tuners 28 convert a radio frequency digital television transmission into audio and video data signals which can be further processed to produce audio content such as sound and visual content such as picture or video. The tuners 28 are implemented to tune different television standard formats (e.g., PAL, NTSC, ATSC, SECAM, DVB-C, DVB-T, DVB-T2, ISDB, T-DMB, and open cable). It is contemplated by the present disclosure that the tuners 28 can perform internet video streaming and include multiple tuners implemented for tuning multiple selected channels.

The power supply 29 includes a self-contained power source such as a battery pack with an interface to be powered through an electrical charger connected to an outlet (e.g., either directly or by way of another device). The power supply 29 can also include a rechargeable battery that can be detached allowing for replacement such as a nickel-cadmium (NiCd), nickel metal hydride (NiMH), a lithium-ion (Li-ion), or a lithium Polymer (Li-pol) battery. The microphone 30 is a standard built-in microphone for converting sound waves into electrical energy such as a piezoelectric microelectromechanical system (MEMS) microphone. Communication between the components (e.g., 20-30) of the media hub device 2 are established using the internal bus 31.

Figure 3:
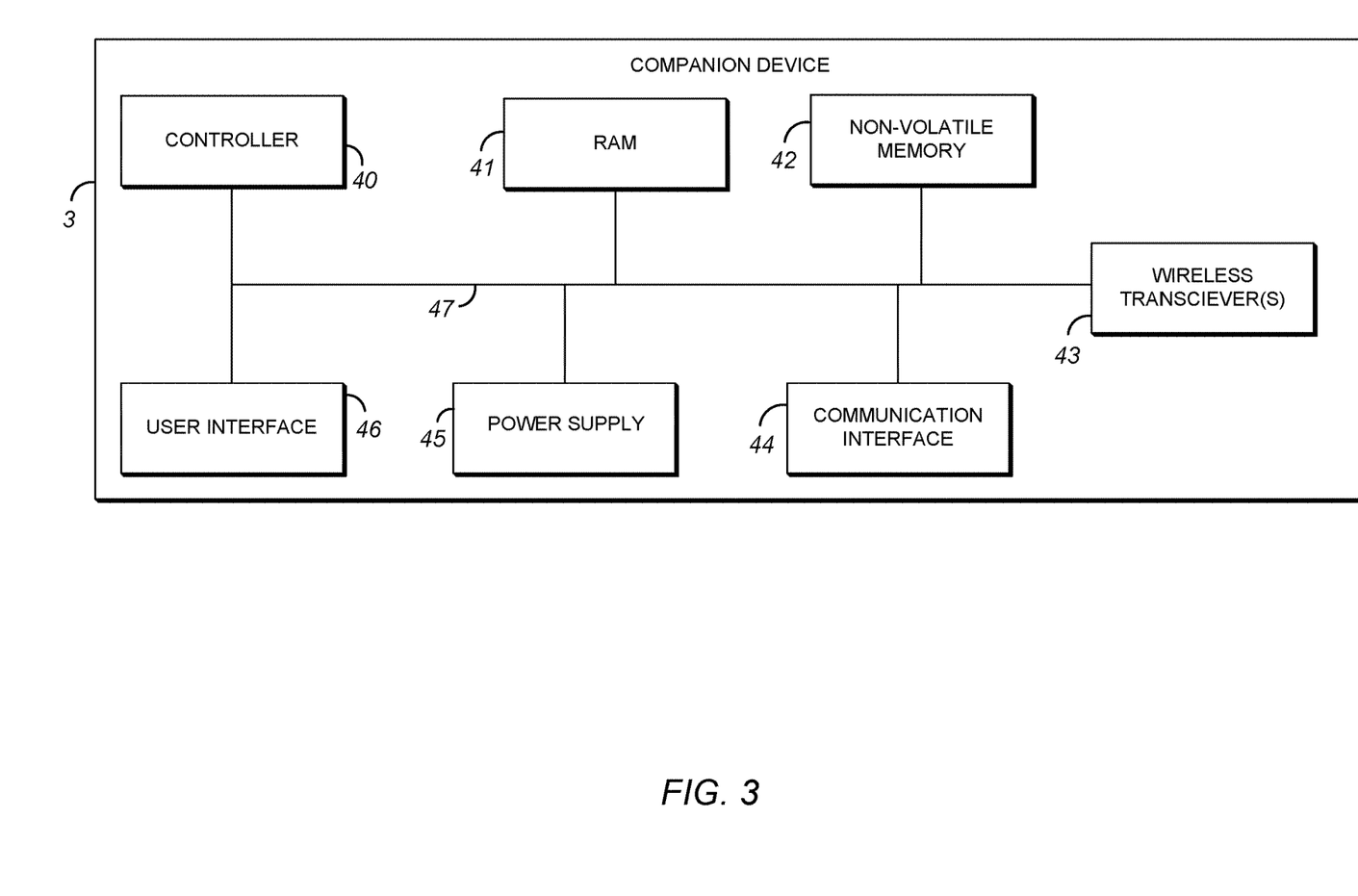
FIG. 3 illustrates a more detailed schematic diagram of an exemplary companion device according to an embodiment of the present disclosure.

FIG. 3. illustrates a more detailed schematic diagram of an exemplary companion device according to an embodiment of the present disclosure. It is contemplated by the present disclosure that the companion device 3 can include a computer, a portable device, an electronic tablet, a smart phone, or other wireless hand-held consumer electronic device capable of executing and outputting audio and visual content.

As shown in FIG. 3, the companion device 3 includes a controller 40, a RAM 41, a non-volatile memory 42, one or more wireless transceivers 43, communication interface 44, a power supply 45, and a user interface 46. The controller 40 controls the general operations of the companion device 3 and includes, but is not limited to, a CPU, a hardware microprocessor, a multi-core processor, a single core processor, an FPGA, a microcontroller, an ASIC, a DSP, or other similar processing device capable of executing any type of instructions, algorithms, or software for controlling the operation and performing the functions of the companion device 3 in accordance with the present disclosure.

The RAM 41 can be implemented as a working memory for the controller 40 and the non-volatile memory 42 can be provided for storage of program code, software, or algorithms for implementing the control and operations of the companion device 3 in accordance with the present disclosure. The non-volatile memory 42 can also include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The one or more wireless transceivers 43 includes various network cards, interfaces, and circuitry implemented in software and/or hardware to enable communications between the companion device 3 and the media hub devices 2 using a wireless connection via connection 9 in accordance with Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using short-wavelength UHF radio waves from 2.4 to 2.485 GHz.

Additionally, the one or more wireless transceivers 44 includes various network cards, interfaces, and circuitry implemented in software and/or hardware to enable communications with the companion device 3 in accordance with, but is not limited to, IEEE 802.11 protocol, an RF4CE protocol, ZigBee protocol, Z-Wave protocol, or IEEE 802.15.4 protocol.

The communication interface 44 includes various network cards, interfaces, and circuitry implemented in software and/or hardware to enable communications with the companion device 3 using a DSL connection, a cable modem, a broadband mobile phone network, MoCA network, or other similar connections. It is also contemplated by the present disclosure that the communication interface 44 includes various network cards, interfaces, and circuitry implemented in software and/or hardware to enable communications with the companion device 3 using a protocol in accordance with a WAN, a LAN, a VPN, MANs, PANs, and WLANs, SANs, a PTSA, a global Telex network, or a 2G, 3G, 4G or 5G network.

The power supply 45 includes a self-contained power source such as a battery pack with an interface to be powered through an electrical charger connected to an outlet (e.g., either directly or by way of another device). The power supply 45 can also include a rechargeable battery that can be detached allowing for replacement such as a NiCd, a NiMH, a Li-ion, or a Li-pol battery. The user interface 46 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the companion device 3. Communication between the components (e.g., 40-46) of the companion device 3 are established using the internal bus 47.

In an embodiment described in the present disclosure a companion device 3 transfers a media session to a media hub device 2 connected in a network. The one or more programs stored in the companion device 3 when executed by the controller 40 detect a swipe operation performed using the user interface 46 of the companion device 3, and the companion devices 3 transfers, over Internet Protocol (IP) and using the communication connection 9, a media session to the media hub device 2 having the strongest signal strength, based on a stored IP address for the media hub device.

One previous solution for transferring a media session required a user to select the destination device using, for example, a drop down menu and then route the video or audio to the selected destination device. However, this solution can result in the selection of the wrong destination device, or a destination device that is out of range and not necessarily the best destination device for transferring the media session, thereby negatively affecting the quality of transferred media session. The apparatus, system, method, and computer program of the present disclosure allows for the quick, efficient, and effective detection of devices in a wireless network and the transfer of a media session without affecting the quality of the transferred media session. A detailed discussion of methods and algorithms for transferring a media session between devices in a wireless network are described in detailed with reference to FIGS. 4 and 5.

Figure 4:
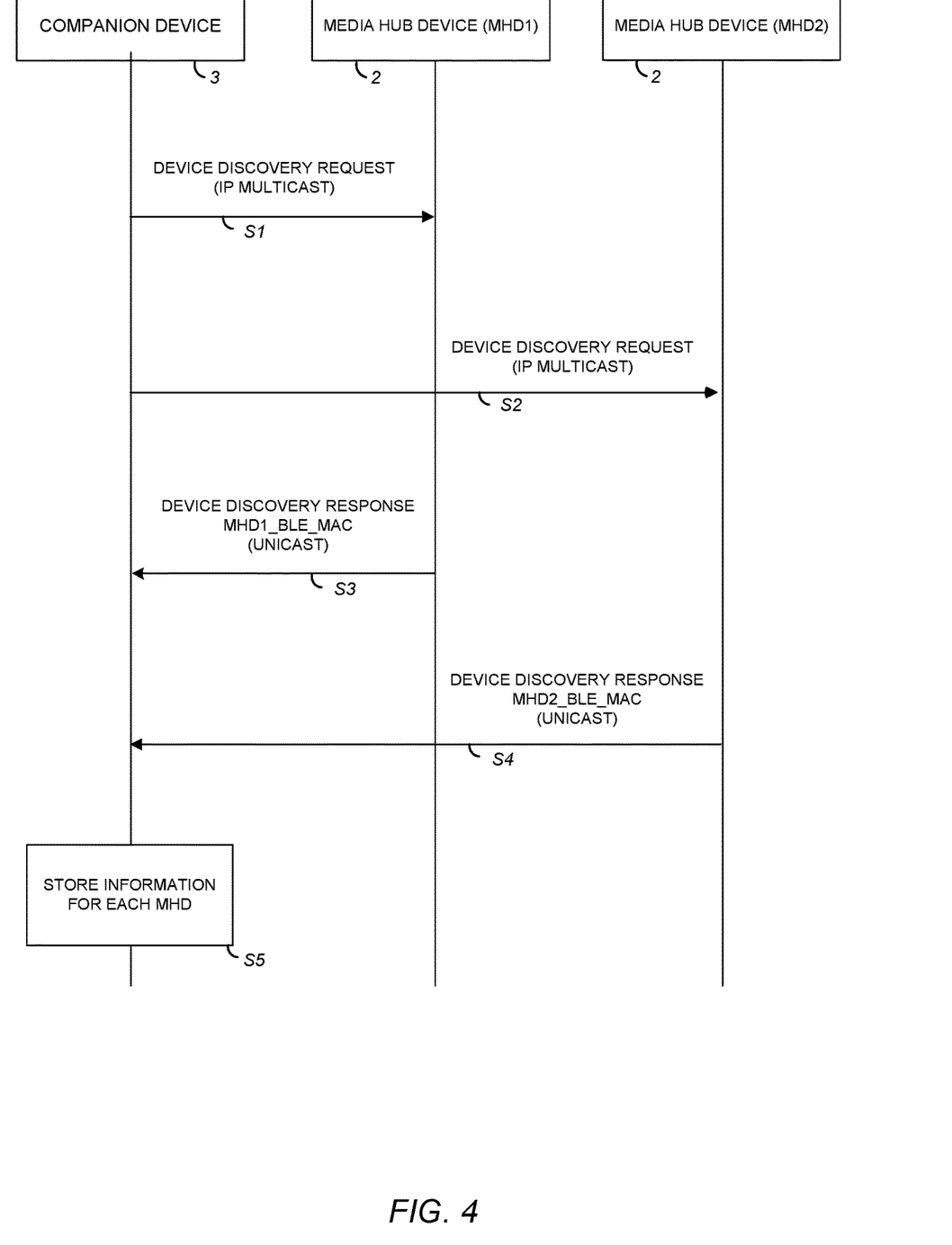
FIG. 4 illustrates a method and algorithm for periodic device discovery according to an embodiment of the present disclosure.

FIG. 4 illustrates a method and algorithm for periodic device discovery according to an embodiment of the present disclosure. FIG. 4 describes a method and algorithm for performing a periodic device discovery between a companion device 3 and two media hub devices 2 (e.g., MHD1 and MHD2). Although FIG. 4 shows one companion device 3 and two media hub devices 2, it is contemplated by the present disclosure that the periodic device discovery could be conducted between any number of companion devices 3 and media hub devices 2 in the network.

In steps S1 and S2, the companion device 3 transmits a device discovery request (IP multicast) to the media hub devices 3 (e.g., MHD1 and MHD2). The device discovery request can be used to detect all media hub devices 2 in the network. In this example, the device discovery request is sent utilizing an IP multicast device discovery protocol such as those defined by discovery-and-launch (DIAL) protocol, universal plug and play (UPnP) protocol, or simple service discovery (SSDP) protocol, with minor modifications. In steps S3 and S4, the media hub devices 2 (e.g., MHD1 and MHD2) in the network reply to the device discovery request by transmitting a device discovery response including their device name and BLE MAC address (e.g., MHD1_BLE_MAC and MHD2_BLE_MAC). In step S5, the companion device 3 creates and stores a table of all the media hub devices 2 in the network along with their corresponding BLE MAC addresses in, for example, a memory 41, 42 of the companion device 3. An exemplary table stored in the companion device 3 is shown below in Table 1.

TABLE 1

| MHD Name/IP Address | BLE MAC Address |
| --- | --- |
| MHD1 (192.168.12.2) | AA:BB:CC:DD:EE:FF |
| MHD2 (192.168.12.3) | AA:HH:NN:BB:KK:LL |

The device discovery described in FIG. 4 is done independently and periodically by the companion device 3 to maintain an updated list of media hub devices 2 in the network and their corresponding BLE MAC addresses. Although FIG. 4 illustrates the use of the device discovery request sent utilizing an IP multicast device discovery protocol such as DIAL protocol, UPnP protocol, or SSDP protocol, it is also contemplated by the present disclosure that the device discovery request can be achieved using any application protocol (e.g., built on top of SSDP or multicast domain name system (mDNS)).

Figure 5:
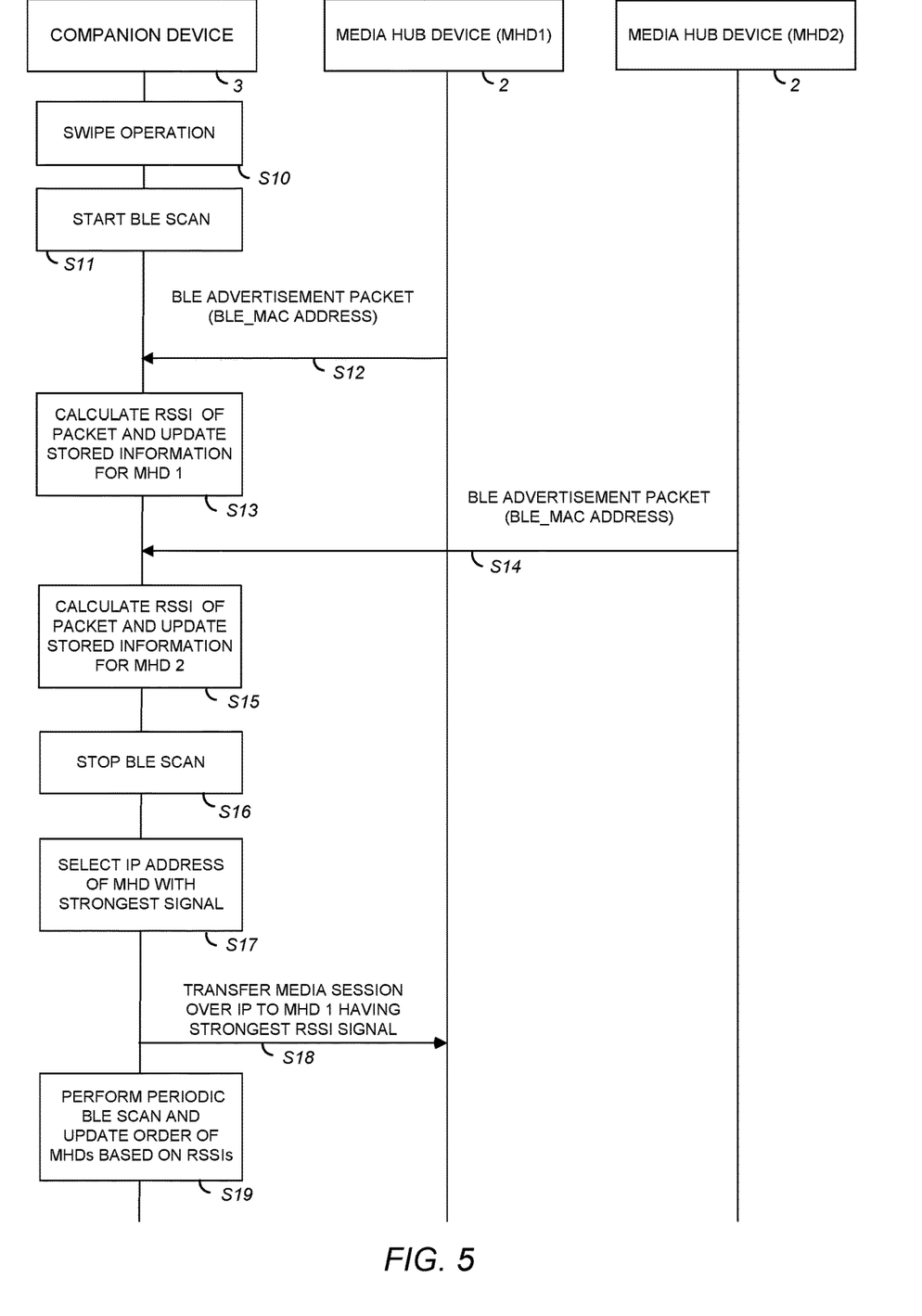
FIG. 5 illustrates a method and algorithm for transferring a media session from a companion device to a media hub device connected in a network according to an embodiment of the present disclosure.

FIG. 5 illustrates a method and algorithm for transferring a media session from a companion device 3 to a detected media hub device connected in a network according to an embodiment of the present disclosure. FIG. 5 describes a method and algorithm for performing a media session transfer between a companion device 3 and the determined nearest media hub device 2 (e.g., MHD1). Although FIG. 5 shows one companion device 3 and two media hub devices 2, it is contemplated by the present disclosure that the media session transfer can be conducted between any number of companion devices 3 and media hub devices 2 in the network.

In step S10, a user performs a swipe operation using the user interface 46 of the companion device 3. In step S11, the one or more programs stored in the companion device 3 when executed by the controller 40 detect the swipe operation performed using the user interface 46, and initiate a BLE scan using the one or more wireless transceivers 43 of the companion device, which is transmitted to all the media hub devices 2 in the network. The BLE scan from the companion device 3 can be for a fixed interval (e.g., 2 seconds). In step S12, a media hub device 2 (e.g., MHD1) first receiving the BLE scan transmits a standard BLE advertisement packet back to the companion device 3 using one or more wireless transceivers 24. The BLE advertisement packet includes the BLE MAC address for the media hub device 2 (e.g., MHD1) transmitting the BLE advertisement packet. In step S13, one or more programs stored in the companion device 3 calculate a received signal strength indicator (RSSI) indicating the signal strength of the media hub device 2 (e.g., MHD1) transmitting the BLE advertisement packet and updates the table for MHD1's BLE MAC address to include an RSSI value. The update would include, for example, the RSSI and signal strength (e.g., in decibels (dB)) of the media hub device 2 (e.g., MHD1) transmitting the BLE advertisement packet.

Similarly, in step S14, another media hub device 2 (e.g., MHD2) transmits a standard BLE advertisement packet back to the companion device 3 using one or more wireless transceivers 24. The BLE advertisement packet includes the BLE MAC address for the media hub device 2 (e.g., MHD2) transmitting the BLE advertisement packet. In step S15, the one or more programs stored in the companion device 3 calculate the RSSI indicating the signal strength of the media hub device 2 (e.g., MHD2) transmitting the BLE advertisement packet and updates the table for MHD2's BLE MAC address to include an RSSI value. The update would include, for example, the RSSI and signal strength (e.g., in dB) of the media hub device 2 (e.g., MHD2).

A network could include non-media hub BLE devices. However, the companion device 3 can filter out these devices by checking the BLE MAC addresses present in the list of media hub devices 2 provided in the table (e.g., created during device discovery). Thus, after the interval for performing the BLE scan, the companion device 3 should have a list of all the media hub devices 2 with their corresponding BLE RSSI values. The RSSI values can fluctuate during the BLE scan process, therefore an average RSSI value for each media hub device 2 can be used for determining the signal strength. Additionally, other criteria can be implemented such as determining the median or normal distribution of the RSSI values. An exemplary updated table based on the RSSI values is shown below.

TABLE 2

| MHD Name/IP Address | BLE MAC Address | RSSI (dB) |
| --- | --- | --- |
| MHD1 (192.168.12.2) | AA:BB:CC:DD:EE:FF | −30 |
| MHD2 (192.168.12.3) | AA:HH:NN:BB:KK:LL | −60 |

In step S16, the companion device 3 stops the BLE scan at the end of the interval. In step S17, the companion device 3 will sort the list of media hub devices 2 in the table (e.g., highest to lowest signal strength) and determine the media hub device 2 with the strongest signal strength in the table. As shown in Table 2, MHD1 has the strongest signal strength. The signal strength is an indication of the distance of the media hub device 2 to the companion device 3. Thus, the stronger the signal strength the closer the media hub device 2 is assumed to be to the companion device 3. It is contemplated by the present disclosure that the strongest signal strength in the table must also be higher than a certain threshold value in order to achieve accurate media session transfer from the companion device 3 to a media hub device 2. In step S18, the companion device 3 transfers a media session over IP to the media hub device 2 having the strongest signal strength (e.g., MHD 1) using the IP address for the media hub device 2 in the table.

In addition to RSSI, a BLE beacon can be used to provide for a distance calculation. That is, the BLE beacon packet itself has a 1 byte field txPower, which indicates measured power. This value is provided by the BLE hardware manufacturer and denotes what the expected signal level should be when the device is one meter away. Thus, it may be possible to use both the txPower value and the RSSI to calculate a more accurate distance of a media hub device 2 to a companion device 3.

In step S19, the companion device 3 performs a periodic BLE scan of the media hub devices 2 in the network and periodically updates the order of the list of media hub devices 2 in the table (e.g., Table 2) based on any changes in the calculated RSSIs. Therefore, the list of media hub devices 2 in the table can be updated so that the companion device 3 always includes an updated list of the media hub devices 2 and their corresponding RSSIs. It is also contemplated by the present disclosure that the period for conducting the BLE scan in step S19 can vary and can even can be a continuous scan operation, if desired.

The apparatus, system, method, and computer programs of the present disclosure allow the companion device 3 to quickly, efficiently, and effectively detect media hub devices 2 in the network and transfer a media session to the nearest media hub device 2. The one or more programs stored in the companion device 3 when executed by the controller 40 detect a swipe operation performed using the user interface 46 of the companion device, and the companion devices 3 transfers, over IP and using the communication connection 9, a media session to the media hub device 2 having the strongest signal strength, based on a stored IP address for the media hub device.

One previous solution for transferring a media session required a user to select the destination device using, for example, a drop down menu and then route the video or audio to the selected destination device. However, this previous solution can result in the selection of the wrong destination device, or a destination device that is out of range or not necessarily the best destination device for transferring the media session, thereby negatively affecting the quality of transferred media session. The apparatus, system, method, and computer program of the present disclosure allow for a media session to be quickly, efficiently, and effectively detect wireless devices in the network and transfer a media session without affecting the quality of the transferred media.

The present disclosure can be implemented as any combination of an apparatus, a system, method, and a computer program on a non-transitory computer readable recording medium. The one or more processors can be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 4 and 5. For example, the one or more memories stores software or algorithms with executable instructions and the one or more processors can execute a set of instructions of the software or algorithms in association with performing the device discovery and media session transfer between devices in a network according to the embodiments of the present disclosure. The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that can replace any of the above implemented technologies.

Additionally, the above description provides examples, and is not limiting of the scope, applicability, or configuration set forth in the claims. Changes can be made in the function and arrangement of elements discussed without departing from the spirit and scope of the disclosure. Various embodiments can omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method for transferring a media session from a companion device to a media hub device connected in a network, the method comprising:
    executing a swipe operation on the companion device in order to initiate a transfer of the media session;
    transmitting a scan request from the companion device to media hub devices connected in the network based on the swipe operation;
    receiving at the companion device a response packet from each media hub device based on the scan request, each response packet including a media access control (MAC) address;
    calculating in the companion device a received signal strength indicator (RSSI) indicating signal strengths of the media hub devices based on each response packet;
    determining in the companion device a media hub device having a strongest signal strength based on the calculated RSSI and the MAC address for each media hub device; and
    transferring over Internet Protocol (IP) a media session executing on the companion device to the media hub device having the strongest signal strength using a stored IP address for the media hub device,
    wherein the transmitting of the scan requests, the receiving of the response packets, the calculating of the RSSIs, the determining the hub media device, and the transferring of the media session are sequentially performed based on the execution of the swipe operation, and
    wherein the method further comprises:
    periodically transmitting from the companion device an IP multicast device discovery request to the media hub devices; and
    creating in the companion device a table of all the media hub devices in the network, the table including the device names, corresponding IP addresses, and the MAC addresses of the media hub devices,
    wherein the stored IP address used for transferring the media session to the media hub device is selected from the table.

2. The method according to claim 1, wherein each response packet includes and the method further comprises:
    receiving at the companion device a unicast device discovery response from each media hub device based on the device discovery request, each device discovery response including the device name and the MAC address of each media hub device transmitting the device discovery response.

3. The method according to claim 1, wherein each response packet is a Bluetooth Low Energy (BLE) advertisement packet and the MAC address is a BLE MAC address.

4. The method according to claim 2, wherein the MAC address in each device discovery response is a BLE MAC address.

5. The method according to claim 2, further comprising:
    updating the table in the companion device to include the signal strengths of the media hub devices based on the RSSIs,
    wherein the signal strengths and order of the media hub devices in the table are periodically updated based on changes in the RSSIs.

6. A non-transitory computer-readable recording medium in transferring a media session from a companion device to a media hub device connected in a network, the non-transitory computer-readable recording medium storing one or more programs which when executed by a hardware processor of the companion device perform steps comprising:

detecting a swipe operation performed on the companion device, the swipe operation being performed in order to initiate a transfer of a media session;

transmitting a scan request from the companion device to media hub devices connected in the network based on the swipe operation;

receiving at the companion device a response packet from each media hub device based on the scan request, each response packet including a media access control (MAC) address;

calculating in the companion device a received signal strength indicator (RSSI) indicating signal strengths of the media hub devices based on each response packet;

determining in the companion device a media hub device having a strongest signal strength based on the calculated RSSI and the MAC address for each media hub device; and     transferring over Internet Protocol (IP) a media session executing on the companion device to the media hub device having the strongest signal strength using a stored IP address for the media hub device,     wherein the transmitting of the scan requests, the receiving of the response packets, the calculating of the RSSIs, the determining the hub media device, and the transferring of the media session are sequentially performed based on the detected swipe operation, and     wherein the one or more programs when executed by the hardware processor further comprises:

periodically transmitting from the companion device an IP multicast device discovery request to the media hub devices; and     creating in the companion device a table of all the media hub devices in the network, the table including the device names, corresponding IP addresses, and the MAC addresses of the media hub devices,     wherein the stored IP address used for transferring the media session to the media hub device is selected from the table.

7. The non-transitory computer-readable recording medium method according to claim 6, wherein each response packet includes a device name, and     the one or more programs when executed by the hardware processor further comprises:

receiving at the companion device a unicast device discovery response from each media hub device based on the device discovery request, each device discovery response including the device name and the MAC address of each media hub device transmitting the device discovery response.

8. The non-transitory computer-readable recording medium according to claim 6, wherein each response packet is a Bluetooth Low Energy (BLE) advertisement packet and the MAC address is a BLE MAC address.

9. The non-transitory computer-readable recording medium according to claim 7, wherein the MAC address in each device discovery response is a BLE MAC address.

10. The non-transitory computer-readable recording medium according to claim 7, further comprising:

updating the table in the companion device to include the signal strengths of the media hub devices based on the RSSIs,     wherein the signal strengths of the media hub devices in the table are periodically updated based on changes in the RSSIs.

11. A system for transferring a media session from a companion device to a media hub device connected in a network, the system comprising:

a companion device configured to execute the media session, the companion device including a communication interface, a user interface, a hardware processer, and a memory storing one or more programs;

media hub devices each configured to receive and execute the media session, each media hub device including a communication interface, a hardware processer, and a memory storing one or more programs; and     a communication connection configured to establish a connection between the communication interface of the companion device and the communication interface of each media hub device,     wherein the one or more programs when executed by the respective hardware processors of the companion device and the media hub devices control the system to:

detect a swipe operation performed using the user interface of the companion device, the swipe operation being performed in order to initiate a transfer of a media session,     transmit a scan request from the communication interface of the companion device to communication interfaces of the media hub devices over the communication connection, based on the swipe operation,     receive at the communication interface of companion device a response packet transmitted over the communication connection from each media hub device based on the scan request, each response packet including a media access control (MAC) address;

calculate in the companion device a received signal strength indicator (RSSI) indicating signal strengths of the media hub devices based on each response packet,     determine in the companion device a media hub device having a strongest signal strength based on the calculated RSSI and the MAC address for each media hub device; and     transfer, over Internet Protocol (IP) and using the communication connection, the media session executing on the companion device to the media hub device having the strongest signal strength, based on a stored IP address for the media hub device,     wherein the transmitting of the scan requests, the receiving of the response packets, the calculating of the RSSIs, the determining the hub media device, and the transferring of the media session are sequentially performed based on the detected swipe operation, and     wherein the one or more programs when executed by the respective hardware processors of the companion device and the media hub devices further control the system to:

periodically transit from the communication interface of companion device over the communication connection an IP multicast device discovery request to the media hub devices; and     create in the memory of the companion device a table of all the media hub devices in the network, the table including the device names, corresponding IP addresses, and the MAC addresses of the media hub devices, wherein the stored IP address used to transfer the media session to the media hub device is selected from the table.

12. The system according to claim 11, wherein each response packet includes a device name, and
the one or more programs when executed by the respective hardware processors of the companion device and the media hub devices further control the system to:
receive at the communication interface of the companion device a unicast device discovery response from each media hub device transmitted over the communication connection based on the device discovery request, each device discovery response including the device name and the MAC address of each media hub device transmitting the device discovery response.

13. The system according to claim 11, wherein each response packet is a Bluetooth Low Energy (BLE) advertisement packet and the MAC address is a BLE MAC address.

14. The system according to claim 12, wherein the MAC address in each device discovery response is a BLE MAC address.

15. The system according to claim 11, wherein the one or more programs when executed by the respective hardware processors of the companion device and the media hub devices further control the system to:
update the table in the memory of the companion device to include the signal strengths of the media hub devices based on the RSSIs,
wherein the signal strengths of the media hub devices in the table are periodically updated based on changes in the RSSIs.

16. The system according to claim 11, wherein the media hub device is a set-top box or smart media device, and the network is a residential wireless network.

17. The system according to claim 11, wherein the companion device is wireless mobile device including a smartphone, tablet, digital personal assistance, or hand-held wireless device.

18. A companion device for transferring a media session to a media hub device connected in a network, the companion device comprising:
a communication interface;
a user interface;
a hardware processer; and
a memory storing one or more programs,
wherein the one or more programs when executed by the hardware processor control the companion device to:
detect a swipe operation performed via the user interface, the swipe operation being performed in order to initiate a transfer of the media session,
transmit a scan request from the communication interface to media hub devices over a communication connection, based on the swipe operation,
receive at the communication interface a response packet transmitted over the communication connection from each media hub device based on the scan request, each response packet including a media access control (MAC) address;
calculate a received signal strength indicator (RSSI) indicating signal strengths of the media hub devices based on each response packet,
determine a media hub device having a strongest signal strength based on the calculated RSSI and the MAC address for each media hub device; and
transfer, over Internet Protocol (IP) and using the communication connection, the media session executing on the companion device to the media hub device having the strongest signal strength, based on a stored IP address for the media hub device,
wherein the transmitting of the scan requests, the receiving of the response packets, the calculating of the RSSIs, the determining the hub media device, and the transferring of the media session are sequentially performed based on the detected swipe operation, and
wherein the one or more programs when executed by the hardware processor further control the companion device to:
periodically transmit from the communication interface over the communication connection an IP multicast device discovery request to the media hub devices; and
create in the memory of the companion device a table of all the media hub devices in the network, the table including the device names, corresponding IP addresses, and the MAC addresses of the media hub devices,
wherein the stored IP address used to transfer the media session to the media hub device is selected from the table.

19. The companion device according to claim 18, wherein each response packet includes a device name, and
receive at the communication interface a unicast device discovery response from each media hub device transmitted over the communication connection based on the device discovery request, each device discovery response including the device name and the MAC address of each media hub device transmitting the device discovery response.

20. The companion device according to claim 18, wherein the one or more programs when executed by the hardware processor further control the companion device to:
update the table in the companion device to include the signal strengths of the media hub devices based on the RSSIs,
wherein the signal strengths of the media hub devices in the table are periodically updated based on changes in the RSSIs.

21. The companion device according to claim 18, wherein the companion device is wireless mobile device including a smartphone, tablet, digital personal assistance, or hand-held wireless device.

* * * * *